US012695787B2

(12) United States Patent
Altayyar et al.

(10) Patent No.: US 12,695,787 B2
(45) Date of Patent: Jul. 28, 2026

(54) METHOD OF DETECTING POTENTIAL ARABIC PHISHING EMAILS

(71) Applicant: SAUDI ARABIAN OIL COMPANY, Dhahran (SA)

(72) Inventors: Abdullah A. Altayyar, Dhahran (SA); Ahmad Hmood M. Al Deiaj, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 35 days.

(21) Appl. No.: 18/817,700

(22) Filed: Aug. 28, 2024

(65) Prior Publication Data

US 2026/0067331 A1 Mar. 5, 2026

(51) Int. Cl.
*H04L 9/40* (2022.01)

(52) U.S. Cl.
CPC ............................... *H04L 63/1483* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 2016/0044054 A1* | 2/2016 | Stiansen | ............. | H04L 63/1416 726/24 |
| 2020/0314125 A1* | 10/2020 | Hall | ....................... | G06F 21/564 |
| 2022/0043911 A1* | 2/2022 | Pomerantsev | ........ | G06F 21/566 |
| 2022/0385675 A1* | 12/2022 | Tora | ......................... | G06N 5/04 |

| | | | | |
|---|---|---|---|---|
| 2023/0089069 A1* | 3/2023 | Small | .................. | H04L 63/1416 726/23 |
| 2023/0179631 A1* | 6/2023 | Ben David | ......... | H04L 63/1491 726/23 |
| 2023/0315993 A1* | 10/2023 | Nieborowski | .......... | G06F 16/35 704/9 |

(Continued)

FOREIGN PATENT DOCUMENTS

EP          4097944 B1 *  8/2023    ............... G06N 3/09

OTHER PUBLICATIONS

Maroofi et al, "Adoption of Email Anti-Spoofing Schemes: A Large Scale Analysis", Published in: IEEE Transactions on Network and Service Management, Date of Publication: Mar. 11, 2021, ( vol. 18, Issue: 3, Sep. 2021), pp. 3184-3196 (Year: 2021).*

*Primary Examiner* — Sakinah White Taylor
(74) *Attorney, Agent, or Firm* — Osha Bergman Watanabe & Burton LLP

(57) ABSTRACT

A method for detecting Arabic phishing emails includes connecting a log management solution to an email management solution that includes a spam repository and one or more emails. The spam repository includes one or more Indicators of Compromise (IoCs) that is digital information associated with a cyberattack. An IoC index of the log management solution is populated with the IoCs. The log management solution searches the emails using the IoC index and flags one or more potential phishing emails when an email matches an IoC in the IoC index. The log management solution assigns an authenticity score to each of the potential phishing emails and generates a potential phishing email report containing the potential phishing emails and the authenticity score assigned to each of the potential phishing emails. Based on the potential phishing email report, an assigned user performs one or more remediation actions.

16 Claims, 5 Drawing Sheets

300 ~

310 ~

(56) References Cited

U.S. PATENT DOCUMENTS

2023/0328034 A1 * 10/2023 Behera ................ H04L 63/1408
                                                                   726/22
2024/0330960 A1 * 10/2024 Bitaab ................ G06Q 30/0185
2024/0354500 A1 * 10/2024 Vanatalu .............. G06F 40/216

* cited by examiner

Figure 2:
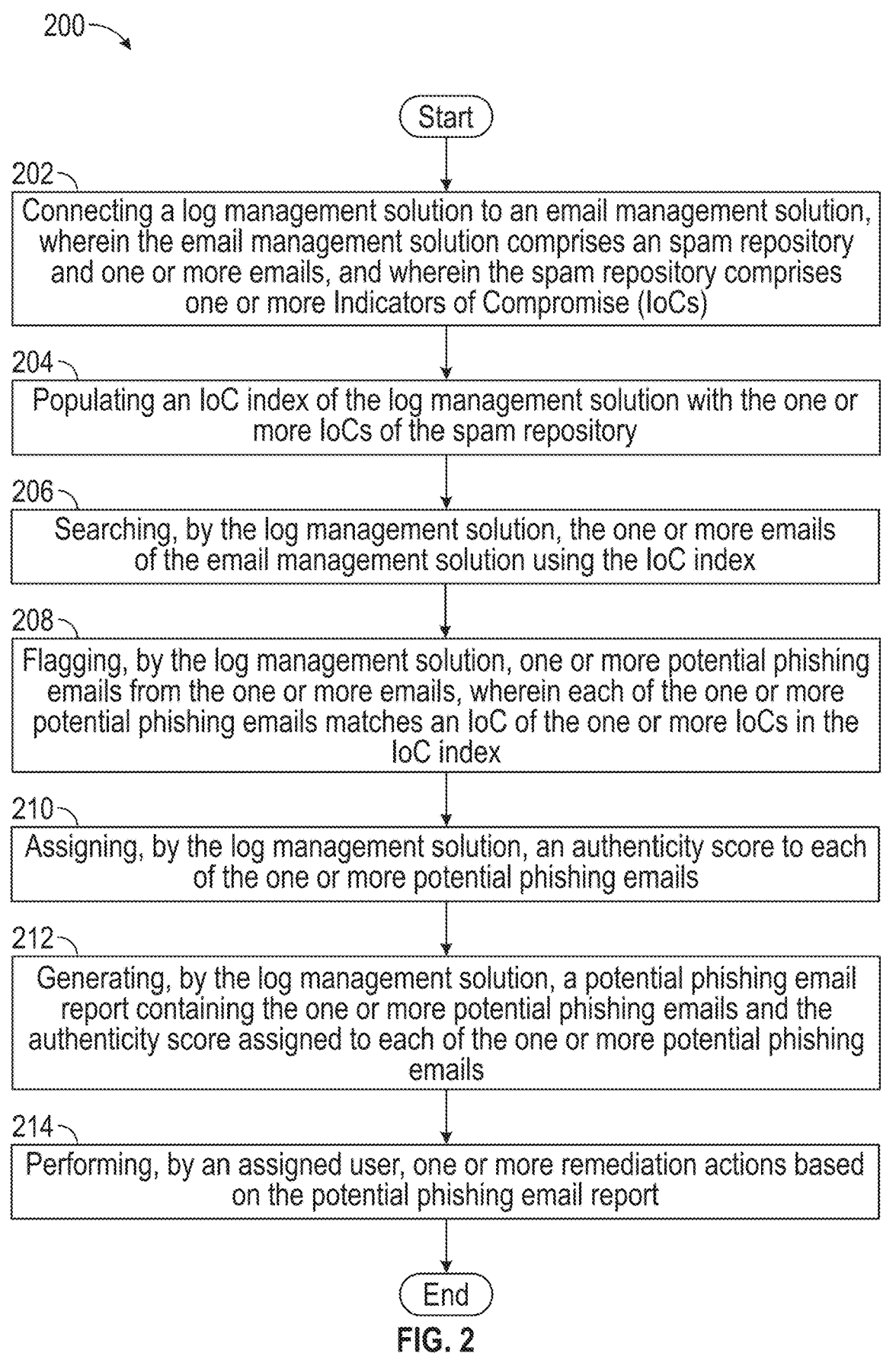

200

Start

202

Connecting a log management solution to an email management solution, wherein the email management solution comprises an spam repository and one or more emails, and wherein the spam repository comprises one or more Indicators of Compromise (IoCs)

204

Populating an IoC index of the log management solution with the one or more IoCs of the spam repository

206

Searching, by the log management solution, the one or more emails of the email management solution using the IoC index

208

Flagging, by the log management solution, one or more potential phishing emails from the one or more emails, wherein each of the one or more potential phishing emails matches an IoC of the one or more IoCs in the IoC index

210

Assigning, by the log management solution, an authenticity score to each of the one or more potential phishing emails

212

Generating, by the log management solution, a potential phishing email report containing the one or more potential phishing emails and the authenticity score assigned to each of the one or more potential phishing emails

214

Performing, by an assigned user, one or more remediation actions based on the potential phishing email report End

| time | Event_id | Message_Subject | Directionality | Sender_Domain | Recipient_Status | Count |
|---|---|---|---|---|---|---|
| 2023-01-15 | Deliver | External تنبيه تسليم الطرد | Incoming | sosstudio.id | DetailFolderType: JunkEmail | 1 |
| 2023-02-22 | Deliver | External SPI On Demand Delivery | Incoming | dreamside.ge | DetailFolderType: JunkEmail | 2 |
| 2023-02-22 | Deliver | External SPI On Demand Delivery | Incoming | gmail.com | DetailFolderType: JunkEmail | 1 |
| 2023-02-22 | Deliver | External SPI On Demand Delivery | Incoming | gmail.com | External | 1 |
| 2023-02-22 | Deliver | External إشعار وصول إلى 851.26 ريال سعودي | Incoming | etudiant.univ-brest.fr | DetailFolderType: JunkEmail | 5 |
| 2023-02-23 | Deliver | External إشعار وصول إلى 851.26 ريال سعودي | Incoming | etudiant.univ-brest.fr | DetailFolderType: JunkEmail | 104 |
| 2023-03-19 | Deliver | External SPI - تنبيه | Incoming | ukrenexpresproarabitas.zendesk.com | DetailFolderType: JunkEmail | 40 |
| 2023-03-19 | Deliver | External SPI - تنبيه | Incoming | ukrenexpresproarabitas.zendesk.com | NULL | 1 |
| 2023-03-24 | Deliver | External 06:15:26 بج 3.75 تخطت ملف تسليم الصور مع رابط AM | Incoming | teonorise.freshdesk.com | DetailFolderType: JunkEmail | 1 |
| 2023-03-31 | Deliver | تنبيه - التسليم حسب الطلب | Incoming | egao-inc.co.jp | DetailFolderType: JunkEmail | 9 |
| 2023-03-31 | Deliver | External 04:00:18 بج 3.75 تخطت ملف تسليم الصور مع رابط AM | Incoming | binhyu.freshdesk.com | DetailFolderType: JunkEmail | 1 |
| 2023-04-21 | Deliver | External Your Delivery is Awaiting Final Process! | Incoming | colortheorylksa.com | DetailFolderType: JunkEmail | 52 |
| 2023-04-21 | Deliver | External Your Delivery is Awaiting Final Process! | Incoming | thevirtualanalytics.com | DetailFolderType: JunkEmail | 47 |
| 2023-04-21 | Deliver | تنبيه تسليم الطرد حسب الطلب | Incoming | poolandmoney.com | DetailFolderType: JunkEmail | 62 |
| 2023-05-05 | Deliver | تنبيه الطرد الخاص بك جاهز للتسليم | Incoming | homebagas.com | DetailFolderType: JunkEmail | 1 |
| 2023-05-07 | Deliver | Suspicious URL [External] تنبيه الطرد الخاص بك جاهز للتسليم | Incoming | asu.edu.tr | DetailFolderType: JunkEmail | 6 |
| 2023-05-19 | Deliver | External تنبيه غير قادر على تسليم الطرد | Incoming | mail.pipefy.com | DetailFolderType: JunkEmail | 16 |
| 2023-05-31 | Deliver | External SPI | 390048144236191 | Incoming | sqekf17305.3m.superemsend.com | DetailFolderType: JunkEmail | 1 |
| 2023-06-01 | Deliver | External SPI | 390048144236191 | Incoming | sqekf17305.3m.superemsend.com | DetailFolderType: JunkEmail | 7 |
| 2023-06-14 | Deliver | External تنبيه التسليم | Incoming | banexpress.com | DetailFolderType: JunkEmail | 1 |
| 2023-06-16 | Deliver | تنبيه التسليم | Incoming | icloud.com | DetailFolderType: JunkEmail | 1 |
| 2023-06-17 | Deliver | External تنبيه التسليم | Incoming | gamma-international.com | DetailFolderType: JunkEmail | 1 |
| 2023-09-04 | Deliver | Suspicious URL [External] تنبيه الطرد الخاص بك جاهز للتسليم - UPS | Incoming | antique-quill.com | DetailFolderType: JunkEmail | 1 |

| _time ⇔ | Event_id⇔ | Message_Subject ⇔ | Directionality ⇔ | Sender_Domain ⇔ | Recipient_Status ⇔ | Count ⇔ |
|---|---|---|---|---|---|---|
| 2024-05-29 | Deliver | External الرقم السري فوري صرفه البنك | Incoming | planningpod.com | DetailFolderType : JunkEmail | 486 |
| 2024-05-29 | Deliver | External الرقم السري فوري صرفه البنك | Incoming | planningpod.com | External | 2 |
| 2024-05-30 | Deliver | External الرقم السري فوري صرفه البنك | Incoming | planningpod.com | DetailFolderType : JunkEmail | 278 |
| 2024-05-30 | Deliver | External الرقم السري فوري صرفه البنك | Incoming | planningpod.com | DetailFolderType : JunkEmail;DetailFolderType : JunkEmail | 2 |
| 2023-05-30 | Deliver | External الرقم السري فوري صرفه البنك | Incoming | planningpod.com | NULL | 4 |
| | | | | | | 772 |

FIG. 3B

METHOD OF DETECTING POTENTIAL ARABIC PHISHING EMAILS

BACKGROUND

As scammers have become more sophisticated, cybercrimes such as phishing have developed into a serious security threat for individuals and businesses alike. Phishing is a method used by criminals to lure individuals into revealing private details such as passwords and sensitive financial and personal information. To accomplish this, scammers rely heavily on a cyberattack technique known as social engineering, in which an individual is psychologically manipulated to share sensitive information, send money, download malicious software, or grant a criminal access to their network. Oftentimes the criminal will gain the trust of an individual by impersonating a trusted source through email.

Security software and spam filters are commonly used in an attempt to stop phishing emails from arriving at their intended destination. However, phishing emails claiming to be from popular social media websites, banks, IT administrators, and even family members often evade these defenses.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for detecting Arabic phishing emails, the method comprising connecting a log management solution to an email management solution, wherein the email management solution comprises a spam repository and one or more emails, and wherein the spam repository comprises one or more Indicators of Compromise (IoCs), wherein the one or more IoCs comprise digital information that has been associated with a cyberattack; populating an IoC index of the log management solution with the one or more IoCs of the spam repository; searching, by the log management solution, the one or more emails of the email management solution using the IoC index; flagging, by the log management solution, one or more potential phishing emails from the one or more emails, wherein each of the one or more potential phishing emails matches an IoC of the one or more IoCs in the IoC index; assigning, by the log management solution, an authenticity score to each of the one or more potential phishing emails; generating, by the log management solution, a potential phishing email report containing the one or more potential phishing emails and the authenticity score assigned to each of the one or more potential phishing emails; and performing, by an assigned user, one or more remediation actions based on the potential phishing email report.

In one aspect, embodiments disclosed herein relate to a system for detecting Arabic phishing emails, the system comprising an email management solution comprising a spam repository and one or more emails, wherein the spam repository comprises one or more IoCs, wherein the one or more IoCs comprise digital information that has been associated with a cyberattack; and a log management solution configured to connect to the email management solution; populate an IoC index of the log management solution with the one or more IoCs of the spam repository; search the one or more emails of the email management solution using the IoC index; flag one or more potential phishing emails from the one or more emails, wherein each of the one or more potential phishing emails matches an IoC of the one or more IoCs in the IoC index; assign an authenticity score to each of the one or more potential phishing emails; generate a potential phishing email report containing the one or more potential phishing emails and the authenticity score assigned to each of the one or more potential phishing emails; and deliver the potential phishing email report to an assigned user of the log management solution.

Other aspects and advantages of the claimed subject matter will be apparent from the following description and the appended claims.

BRIEF DESCRIPTION OF DRAWINGS

Specific embodiments of the disclosed technology will be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIG. 2 shows a flowchart in accordance with one or more embodiments of the present disclosure.

FIGS. 3A-3B show an example search result in accordance with one or more embodiments of the present disclosure.

DETAILED DESCRIPTION

Figure 1:
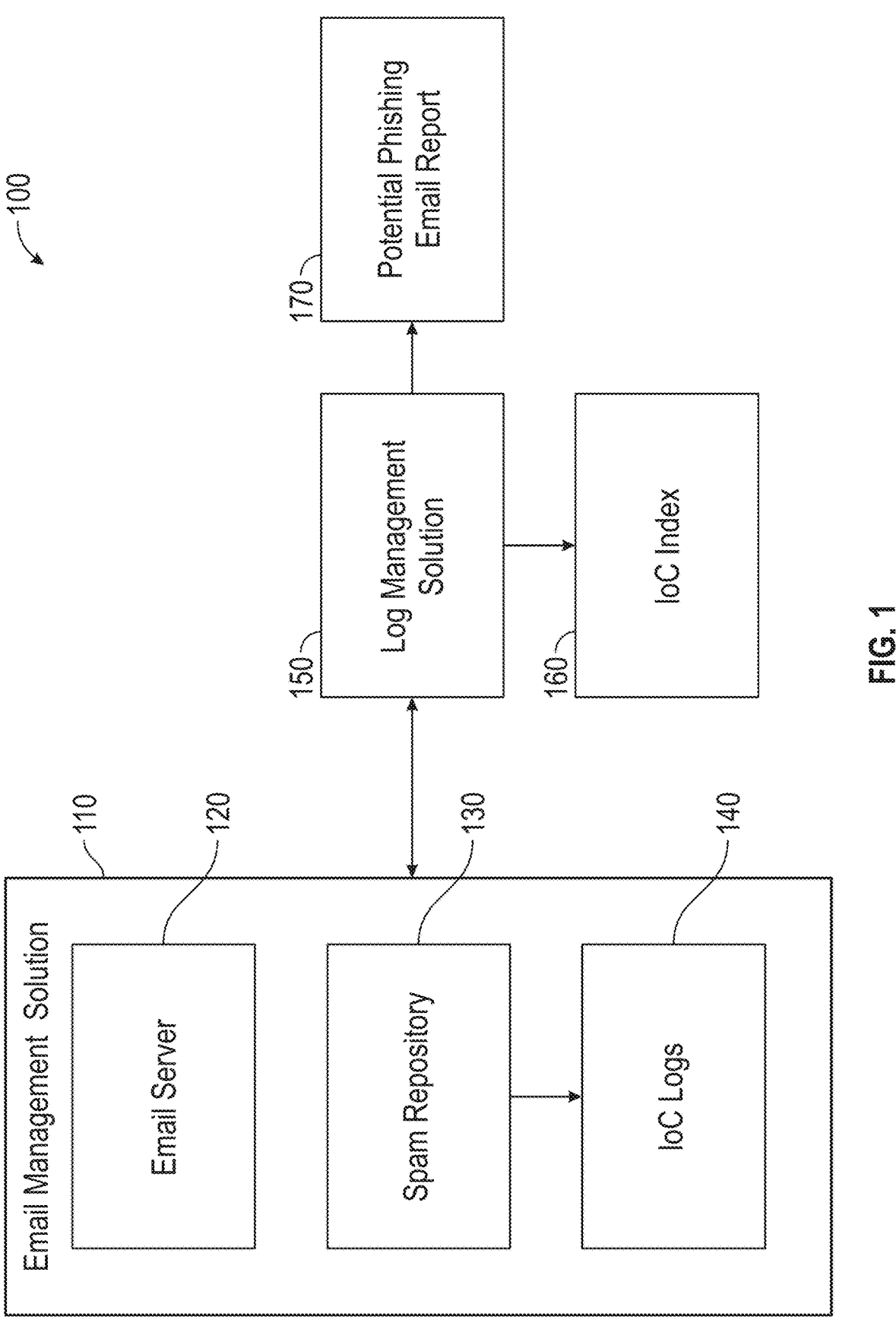
FIG. 1 shows a system in accordance with one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a seismic trace" includes reference to one or more of such traces.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-4, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

A social engineering tactic commonly used in Arabic email phishing attempts involves carefully choosing subject matter that the scammers are proficient in, and using the expertise of the scammers to effectively mimic legitimate emails. These emails often include ostensibly harmless links. Upon clicking the links, users may be directed to a web page that initially does not prompt for sensitive information. Instead, it may request seemingly innocuous details; however, at the final page, the user is prompted to enter sensitive information such as a credit card number or user login credentials. Such tactics make it difficult for conventional security measures to detect malicious intent.

More specifically, existing security measures have difficulty identifying non-English phishing emails because security measures currently in use lack the categorization needed to detect non-English phishing patterns. Consequently, a vulnerability exists for which the method and system of the present application aims to address. The method specifically focuses on recognizing the prevalent patterns employed in the detection of Arabic phishing emails, drawing from a collection of Arabic phishing emails that were both received and reported. Indicators of Arabic phishing emails may be gathered into a dataset which can then be used to enhance the detection of Arabic phishing emails.

The method proposes utilizing the spam database as a repository of indicators of Arabic phishing emails. There currently exists no prior art that utilizes the spam database as a main repository of indicators of Arabic phishing emails. Utilizing the spam database to detect the patterns that have been used in confirmed Arabic phishing emails can raise the quality of detection and provide an extra layer of defense against the increasing number of Arabic phishing attacks.

Accordingly, there exists a need to address the security monitoring gap that exists, specifically in the detection of Arabic phishing emails. The method disclosed herein takes a proactive approach. When at least one user reports a suspicious email as spam, the email can be moved to a spam database, account, index, or inbox, otherwise referred to as a spam repository. The reported email in the spam repository may then be analyzed by an analyst or the Security Operations Center (SOC) of an organization to confirm whether or not the email is indeed a malicious phishing email. If confirmed as a phishing email, the associated Indicators of Compromise (IoCs) can be derived and stored in the spam repository of an email management solution.

Initially, the process begins by connecting the spam repository to a log management solution. This integration allows the sharing of IoCs derived from confirmed Arabic phishing emails that exist in the spam repository. These IoCs, which can include email subjects and sender domains, create a valuable resource for future reference. Next, the log management solution can proactively search for the accumulated IoCs, both recent and historical, across email servers. The goal is to uncover any instances where email containing the IoCs has evaded existing security measures and been delivered to user inboxes. Once a potential phishing email has been identified, an authenticity score may be assigned to the email. The authenticity score can aid in ascertaining the legitimacy of the emails. Finally, a report of the findings may be generated and sent to a cybersecurity analyst and/or the SOC of an organization for further verification and remediation.

In one aspect, embodiments disclosed herein relate to a method and system to detect Arabic phishing emails that have evaded the initial layers of security of an email management solution and have subsequently been delivered to the inbox of a user. In one or more embodiments, a log management solution can receive a list of IoCs from a spam repository that is connected to the email management solution. Upon receiving the IoCs, the log management solution may search the existing email messages in the email servers for information that matches the IoCs, indicating a potential phishing email. The potential phishing email can then be given an authenticity score based on various threat indicators. Once each of the potential phishing emails is assigned an authenticity score, a potential phishing email report containing the discovered potential phishing emails can be generated and sent to cybersecurity professionals for further verification. If confirmed to be an phishing email, one or more remediation actions can be performed.

An email management solution may be software used by an individual or an organization to manage the email that has been delivered to end users of a network. The email management solution may include tools to store, organize, and prioritize email messages for one or more users. An email management solution may also provide access to privacy and security tools, such as a spam inbox or spam repository. A spam repository may be a repository for junk and otherwise suspicious email messages that have been identified by the user. Non-limiting examples of an email management solution are Outlook, Gmail, Mailbird, and Spark.

A log management solution may be software used by an individual or an organization to collect, monitor, and analyze data from sources such as, for example, operating systems, applications, servers, users, and endpoints within an organization. Non-limiting examples of a log management solution are Splunk, LogicMonitor, New Relic, and ManageEngine Log360.

An IoC is a piece of digital information that has been associated with a security breach or cyberattack. Cybersecurity professionals can use IoCs to identify and track down cyber attackers, understand their patterns and methods, and prevent future attacks. As it applies to a phishing email message, an IoC can be, for example, the subject of the email, the IP address of the sender, the email address of the sender, the domain name of the sender, the file name of an attachment in the email, or a web link found within the body of the email.

FIG. 1 shows a block diagram of an Arabic phishing email detection system 100, in accordance with one or more embodiments. Arabic phishing email detection system 100 may include an email management solution 110. As discussed, the email management solution 110 can be software used by an individual or an organization to manage the email that has been delivered to end users of a network. The email management solution 110 can include one or more email servers 120 that are configured to deliver email to the inboxes of one or more users of the email management solution 110. The one or more email servers 120 may also store the email that has been delivered to the one or more users of the email management solution 110. The email management solution 110 may also have or provide access to a spam repository 130. Spam repository 130 may be an account, index, or database in which junk email, also referred to as spam, is stored. A user may designate an email message that has been delivered to an inbox as spam, which would subsequently move the spam to the spam repository 130. Spam repository 130 may keep IoC logs 140 that are a database of IoCs derived from confirmed Arabic phishing email messages. When spam or a potential phishing email is reported by a user or otherwise designated as spam or a potential phishing email, the spam may be reviewed by a cybersecurity professional, such as an analyst or anti-spam reviewer of the SOC, to confirm whether the spam or potential phishing email is a confirmed phishing email. The cybersecurity professional can access the spam repository 130 through, for example, a third-party tool that provides an interface to review the emails or through another means provided by the email management system, such as an Outlook agent. If confirmed as a phishing email, the potential phishing email is tagged by the cybersecurity professional as a confirmed phishing email. Subsequently, IoCs associated with the confirmed phishing email may be determined and added to the IoC logs 140 of the spam repository 130.

Continuing with FIG. 1, Arabic phishing email detection system 100 may also include a log management solution 150. As discussed, log management solution 150 can be software used by an individual or an organization to collect, monitor, and analyze data. Log management solution 150 may receive a list of IoCs from the IoC logs 140 of the spam repository 130 of the email management solution 110. Specifically, once an email is tagged as a confirmed phishing email, all associated IoCs can be automatically sent to the log management solution 150. Upon receipt of the IoCs from the spam repository 130, the log management solution 150 may add the IoCs to an IoC index 160 of the log management solution 150. In one or more embodiments, the IoC index 160 may be a database that is maintained by the email management solution 110 and contains IoCs that have been identified by the spam repository 130 as IoCs from confirmed phishing email messages. Accordingly, as phishing emails are identified and confirmed (i.e., reported by users, reviewed, and confirmed by an analyst), the IoC index 160 may accumulate valuable information in the form of IoCs, such as commonly used subjects, sender domains, and targeted users of phishing emails. The accumulated IoCs may subsequently be used to track Arabic phishing email patterns and adapt to evolving Arabic email phishing techniques.

Subsequently, in one or more embodiments, log management solution 150 can use the IoC index 160 to search email in the one or more email servers 120. More specifically, the IoCs in the IoC index 160 may be used as search criteria to search the email messages that have previously been delivered to the inboxes of users. Email messages that contain an element that matches an IoC in the IoC index 160 may be flagged as a potential phishing email. Once discovered, a potential phishing email may be given an authenticity score based on various threat indicators, such as the age and reputation of the domain of the sender. Finally, based on the search results, the log management solution 150 may generate a potential phishing email report 170, where the potential phishing email report 170 can be a complete list of discovered potential phishing emails and the authenticity scores associated with each potential phishing email. Once generated, potential phishing email report 170 can be sent to cybersecurity personnel for further investigation and remediation, if needed.

Figure 4:
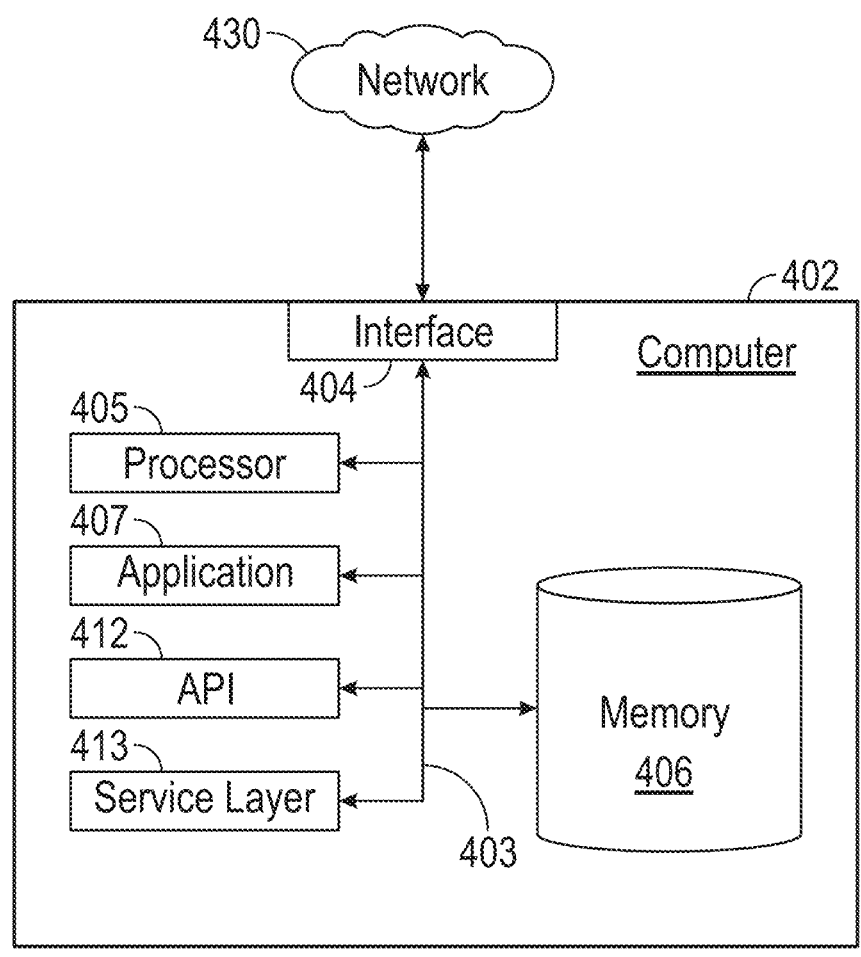
FIG. 4 shows a computing system in accordance with one or more embodiments of the present disclosure.

A flowchart in accordance with one or more embodiments of the disclosure is shown in FIG. 2. Specifically, FIG. 2 describes a method for detecting Arabic phishing emails 200. The method may be implemented on a log management solution 150 using instructions stored on a non-transitory medium that may be executed by a computer 402 system as shown in FIG. 4. While the various steps in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, Block 202 describes connecting a log management solution 150 to an email management solution 110, where the email management solution 110 includes a spam repository 130, and where the spam repository 130 includes one or more IoCs. As discussed, the email management solution 110 can include one or more email servers 120 that are configured to deliver email to the inboxes of one or more users of the email management solution 110. The one or more email servers 120 may also store the email that has been delivered to the one or more users of the email management solution 110. The spam repository 130 can be configured to store junk email, also referred to as spam. A user may designate an email message that has been delivered to an inbox as spam, which would subsequently move the spam to the spam repository 130.

Continuing with Block 202, email in the spam repository 130 may be analyzed manually by a cyber security professional or via a software program to determine if it is malicious. Analysis of the email may determine the email to be tagged as clean, spam, or a phishing email. A clean email may be, for example, an email from a known entity such as a co-worker or friend that does not contain solicitous or malicious content. A spam email may be, for example, an unwanted email from an unknown sender soliciting services, but otherwise harmless. A phishing email may be, as discussed, an email that contains malicious attachments or weblinks that, when opened or followed, can cause harm to a computer or seek to obtain sensitive information from a user. In one or more embodiments, the confirmed phishing email may be an Arabic phishing email. Emails in the spam repository 130 that are determined to be confirmed phishing emails may be tagged as such or moved to a separate database. Once identified, confirmed phishing emails can be analyzed to determine which elements of the phishing email can be saved as IoCs. As discussed, non-limiting examples of an IoC in a phishing email can be the subject of the email, the IP address of the sender, the email address of the sender, the domain name of the sender, the file name of an attachment in the email, or a web link found within the body of the email. In one or more embodiments, IoCs can be saved in IoC logs 140 of the spam repository 130 that may be a database of IoCs obtained from confirmed Arabic phishing email messages. Accordingly, the IoC logs 140 of the email management solution 110 can serve as a valuable repository of IoCs, both historical and recent.

Block 204 describes populating an IoC index 160 of the log management solution 150 with the one or more IoCs of the spam repository 130. As discussed, a log management solution 150 can be software used by an individual or an organization to collect, monitor, and analyze data. In one or more embodiments, through the connection to the email management solution 110, the log management solution 150 can populate a searchable database, referred to as the IoC index 160, with the complete list of IoCs in the IoC logs 140 of the email management solution 110. To keep the IoC index 160 updated with the most recent information, population of the IoC index 160 may be done repeatedly on a regular basis, such as, for example, hourly, daily, or weekly, according to the needs of a user or organization.

Block 206 describes searching, by the log management solution 150, one or more emails of the email management solution 110 using the IoC index 160. The email management solution 110 may include one or more email servers 120 that store email that has been delivered to an end user. As Arabic phishing emails are difficult to detect and often evade security measures, many phishing emails, and Arabic phishing emails in particular, arrive successfully to the inbox of an end user. In one or more embodiments, the log management solution 150 can use the IoC index 160 to search the email that has been delivered to the inboxes of end users to determine if a delivered email could be a phishing email. More specifically, the IoCs in the IoC index 160 may be used as search criteria to search the email messages that have previously been delivered to the inboxes of users. Email messages that contain an element that matches an IoC in the IoC index 160 may be flagged as a potential phishing email.

Block 208 describes flagging, by the log management solution 150, one or more potential phishing emails from the one or more emails, wherein each of the one or more potential phishing emails matches an IoC of the one or more IoCs in the IoC index 160. In one or more embodiments, if the log management solution 150 discovers a delivered email that contains an element that matches an IoC in the IoC index 160, the email can be flagged as a potential phishing email and added to a list of potential phishing emails.

For example, an email from a sender with an email address of "scammer@yahoo.com" had been previously identified as a confirmed phishing email. Consequently, the offending email address had been added as an IoC to the IoC logs 140. The IoC index 160 is populated by the IoC logs 140, and a search is performed on the one or more delivered emails in the email servers 120. If a delivered email is found from a sender with an email address "scammer@yahoo.com", then the email would be flagged as a potential phishing email.

Continuing with Block 208, in one or more embodiments, an identified potential phishing email can be removed or otherwise isolated or made unreadable by an end user until further analysis by the SOC can be performed. In this way, an end user cannot access a potential phishing email until it has been confirmed to be safe, thereby proactively limiting any harm that can be done to the user or organization.

Searching of the email servers 120 may be done repeatedly on a regular basis, such as, for example, hourly, daily, or weekly, according to the needs of a user or organization in order to proactively identify and remove phishing emails before any harm can come to a computer system, organization, or end user.

Block 210 describes assigning, by the log management solution 150, an authenticity score to each of the one or more potential phishing emails. A search of delivered email in an email management solution 110 by the log management solution 150 using the IoC index 160 may result in a list of potential phishing emails. In one or more embodiments, for each potential phishing email, the log management solution 150 is configured to assign an authenticity score that can aid in ascertaining the legitimacy of the potential phishing email. Criteria used in the calculation of an authenticity score may be based on, for example, the subject of the potential phishing email, the country the email originated from, the URL domain, and the age and reputation of the domain of the sender of the potential phishing email. In one or more embodiments, criteria such as subject, domain reputation, and URL domain may carry a heavier weight than other criteria to accurately assess the risk of the potential phishing email being a confirmed phishing email. A potential phishing email that is determined to have a higher risk of being a confirmed phishing email may be assigned a higher authenticity score than a potential phishing email with a lower risk of being a confirmed phishing email. In one or more embodiments, the authenticity score may be represented as a percentage ranging from 10% to 100%. However, the authenticity score may also be represented as, for example, a number, a letter, a Boolean value, or a range.

Continuing with Block 210, the log management solution 150 may make application programming interface (API) calls to external intelligence sources to gain reputation information regarding the potential phishing email. The reputation of the domain of a sender may be checked through an email authentication technique such as Sender Policy Framework (SPF).

Block 212 describes generating, by the log management solution 150, a potential phishing email report 170 containing the one or more potential phishing emails. Once a list of potential phishing emails has been collected and an authenticity score has been assigned to each potential phishing email, the log management solution 150 can generate a potential phishing email report 170. In one or more embodiments, the potential phishing email report 170 can contain the list of potential phishing emails and their respective assigned authenticity scores. The potential phishing email report 170 may be delivered to an assigned user of the network, such as a cybersecurity professional of the SOC, for further analysis and verification. The potential phishing email report 170 can serve as an alert to the SOC of an organization that potential phishing emails exist in the inboxes of users, and further investigation and action may need to be taken. In one or more embodiments, this alert can be generated and sent at a predetermined interval, such as hourly, to the SOC until action is taken to analyze the potential threat.

Block 214 describes performing one or more remediation actions based on the potential phishing email report 170. When the potential phishing email report 170 is received by, for example, a cybersecurity professional of an organization, the cybersecurity professional may then analyze each of the potential phishing emails in the potential phishing email report 170 to determine if the potential phishing email is a confirmed phishing email. In one or more embodiments, the cybersecurity professional may use the authenticity score assigned to a potential phishing email to aid in the verification of the email. If a potential phishing email is proven to be a confirmed phishing email (a true positive), the cybersecurity professional can take appropriate action according to the response plan of the organization with regards to phishing emails. In one or more embodiments, the cybersecurity professional may perform one or more remediation actions in response to identifying a confirmed phishing email. Non-limiting examples of a remediation action may be to permanently remove the confirmed phishing email from the email management solution 110, to update the IoC logs 140 with new IoCs derived from the confirmed phishing email, to inform a user or an organization about the confirmed phishing email, to perform a security screening on the computer system of the receiver of the confirmed phishing email, to block incoming email that contains any IoCs derived from the confirmed phishing email, and to release a confirmed safe email that had previously been isolated from an end user.

FIGS. 3A and 3B show an example search result 300, 310 of an example Splunk query that was used in an experiment to verify the effectiveness of the method and system, in accordance with one or more embodiments. The experiment was performed using Microsoft Exchange Server as the email management solution 110, Splunk as the log management solution 150, and corporate triage as the spam repository 130. The experimental setup was designed to replicate a typical corporate email environment, ensuring the test conditions were as realistic as possible. During the experiment, the primary focus was on collecting a dataset of common Arabic phishing IoCs that could be used to populate the spam repository 130. Once the IoCs were acquired, a nine-month historical search was performed against email servers 120 which involved the analysis of approximately 100,000 emails.

Following is an example of the Splunk query used in the experiment:

index=mail_exchange " OR " تسليم الطرد الخاص بك" OR " الطرد الخاص بك يتعذر تسليم " OR "نكاليف الشحن غير مدفوعة " OR " يخبرك" OR " البريد السعودي ان طردكم قد وصل إلى المقر الخاص بنا " OR" شحنتك في انتظار العملية النهائية في منشأتنا " OR " - سبل: فش ل عملية التسليم البريد السعودي " OR " تتبع الشحنات - البريد السعودي " OR " تتبع الشحنات - spl" OR " طرد في انتظار التسليم " OR" أرسلنا لك 551.26 ريال كهدية لولائك قد لاستلام طلبك المر جوا قم بتسديد مبلغ شحنتك وصلت للبريد المركزي" OR "Your delivery is awaiting final process"OR "SPL On Demand Delivery" OR "SPLاسـل " event_id=DELIVER directionality!=Originating|bin span=1d_time|fillnull value=NULL recipient_status|stats count by_time, event_id message_subject directionality, sender_domain recipient_status In the experiment, the log management solution 150 included the collected IoCs in the Splunk query above to successfully identify confirmed phishing emails that had previously evaded security measures. The experiment was separately performed using the Splunk query above on delivered emails in 2023 and 2024.

FIG. 3A shows the search result 300 of the Splunk query used during the 2023 experiment, in accordance with one or more embodiments. The log management solution used the collected IoCs to successfully identify 362 phishing emails in the 2023 experiment.

FIG. 3B shows the search result 310 of the Splunk query used during the 2024 experiment, in accordance with one or more embodiments. The log management solution used the collected IoCs to successfully identify 772 phishing emails in the 2024 experiment.

The Splunk query may contain several common Arabic Phishing IoCs, as shown in the Splunk query used in the experiment shown above. In the experiment, the Splunk query searched the delivered email for elements that matched the IoCs, and was further designed to order the results of the search by day, count the number of potential phishing emails found, and then present the results in a clear format, as seen in FIGS. 3A and 3B. Specifically, the results shown in FIGS. 3A and 3B show the date of the email, whether the email was delivered/sent, the subject of the email, the directionality of the email (incoming or outgoing), the sender domain, the recipient status of the email (i.e. what happened to the email after it reached the inbox of the user), and how many copies of the email were found.

Those skilled in the art will appreciate that although the examples of FIGS. 3A and 3B do not show an authenticity score, such data may also be included in the results without departing from the scope disclosed herein.

Embodiments of the present disclosure may provide at least one of the following advantages. The proposed technical solution can empower a spam repository 130 by maintaining a database of confirmed Arabic phishing IoCs within IoC logs 140. The IoC logs 140 can serve as a valuable resource not only for identifying elusive Arabic phishing emails, but also for identifying phishing patterns used by cyber-attackers. To enable this functionality, as discussed above, it may be required to connect the IoC logs 140 of an email management solution 110 with a log management solution 150. The integration of the IoC logs 140 with a log management solution 150 can be crucial for facilitating powerful search capabilities and maintaining a long-term, evolving record of IoCs. Consequently, this approach may be particularly beneficial for companies that have an antispam inbox "solution" that is analyzed on a regular basis.

The method offers a strategic advantage in the form of advanced analytics. By leveraging the data from the IoC logs 140 of the spam repository 130, organizations can develop a comprehensive dashboard that can track and display critical metrics such as the most common phishing email subjects, the employees most frequently targeted, and the number of phishing emails that have passed through established security measures and reached the inboxes of end users.

Embodiments of the Arabic phishing email detection system 100 may be implemented on a computer system. FIG. 4 is a block diagram of a computer system 400 used to provide computational functionalities associated with described algorithms, methods, functions, processes, flows, and procedures as described in the instant disclosure, according to an implementation. The illustrated computer 402 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may include a computer that includes an input device, such as a keypad, keyboard, touch screen, or other device that can accept user information, and an output device that conveys information associated with the operation of the computer 402, including digital data, visual, or audio information (or a combination of information), or a GUI.

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, email server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413. The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430. Generally, the interface 404 includes logic encoded in software or hardware (or a combination of software and hardware) and operable to communicate with the network 430. More specifically, the interface 404 may include software supporting one or more communication protocols associated with communications such that the network 430 or interface's hardware is operable to communicate physical signals within and outside of the illustrated computer 402.

The computer 402 includes at least one computer processor 405. Although illustrated as a single computer processor 405 in FIG. 4, two or more processors may be used according to particular needs, desires, or particular implementations of the computer 402. Generally, the computer processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430. For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, the application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

In some embodiments, the computer 402 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for detecting Arabic phishing emails, the method comprising:

connecting a log management solution to an email management solution, wherein the email management solution comprises a spam repository and one or more emails, and wherein the spam repository comprises one or more Indicators of Compromise (IoCs) comprising digital information that has been associated with a cyberattack, wherein the log management solution comprises an IoC index separate from the spam repository, wherein the log management solution and the email management solution are implemented through executable instructions stored on a non-transitory computer-readable medium and configured to be executed by a computer processor of a computer system, wherein the one or more emails have bypassed pre-delivery email security measures and remained accessible in an inbox of an end user of the email management solution;

populating an IoC index of the log management solution with the one or more IoCs of the spam repository;

searching, by the log management solution, the one or more emails of the email management solution using the IoC index;

flagging, by the log management solution, one or more potential phishing emails from the one or more emails, wherein each of the one or more potential phishing emails matches an IoC of the one or more IoCs in the IoC index;

assigning, by the log management solution, an authenticity score to each of the one or more potential phishing emails;

generating, by the log management solution, a potential phishing email report containing the one or more potential phishing emails and the authenticity score assigned to each of the one or more potential phishing emails; and performing, by an assigned user, one or more remediation actions based on the potential phishing email report.

2. The method of claim 1, wherein each of the one or more IoCs is obtained from a confirmed Arabic phishing email.

3. The method of claim 1, wherein populating the IoC index is done repeatedly on a regular basis.

4. The method of claim 1, further comprising:

isolating the one or more potential phishing emails such that the end user of the email management solution cannot access the one or more potential phishing emails.

5. The method of claim 1, wherein searching the one or more emails is done repeatedly on a regular basis.

6. The method of claim 1, wherein the authenticity score is based on a domain age of each of the one or more potential phishing emails and a domain reputation of each of the one or more potential phishing emails.

7. The method of claim 6, wherein the domain reputation is determined through an email authentication technique such as Sender Policy Framework (SPF).

8. The method of claim 1, further comprising:

delivering, by the log management solution, the potential phishing email report to the assigned user of the log management solution; and analyzing, by the assigned user, each of the one or more potential phishing emails in the potential phishing email report to determine when each of the one or more potential phishing emails is a confirmed phishing email, wherein the authenticity score is used in the analyzing.

9. The method of claim 1, wherein a remediation action is one of a following group of remediation actions: to permanently remove a confirmed phishing email from the email management solution, to update the spam repository with one or more new IoCs obtained from the confirmed phishing email, to inform the end user of the email management solution about the confirmed phishing email, to perform a security screening on a receiving computer system of the confirmed phishing email, to block incoming email that contains one or more new IoCs obtained from the confirmed phishing email, and to release a confirmed safe email that had previously been isolated from a user of the email management solution.

10. A system for detecting Arabic phishing emails, the system comprising:

an email management solution comprising a spam repository and one or more emails, wherein the spam repository comprises one or more Indicators of Compromise (IoCs) comprising digital information that has been associated with a cyberattack, wherein the one or more emails have bypassed pre-delivery email security measures and remained accessible in an inbox of an end user of the email management solution; and a log management solution comprising an IoC index separate from the spam repository, the log management solution configured to:

connect to the email management solution;

populate the IoC index of the log management solution with the one or more IoCs of the spam repository;

search the one or more emails of the email management solution using the IoC index;

flag one or more potential phishing emails from the one or more emails, wherein each of the one or more potential phishing emails matches an IoC of the one or more IoCs in the IoC index;

assign an authenticity score to each of the one or more potential phishing emails;

generate a potential phishing email report containing the one or more potential phishing emails and the authenticity score assigned to each of the one or more potential phishing emails; and deliver the potential phishing email report to an assigned user of the log management solution, wherein the log management solution and the email management solution are implemented through executable instructions stored on a non-transitory computer-readable medium and configured to be executed by a computer processor of a computer system.

11. The system of claim 10, wherein each of the one or more IoCs is obtained from a confirmed Arabic phishing email.

12. The system of claim 10, wherein populating the IoC index is done repeatedly on a regular basis.

13. The system of claim 10, wherein the log management solution is further configured to:

isolate the one or more potential phishing emails such that the end user of the email management solution cannot access the one or more potential phishing emails.

14. The system of claim 10, wherein searching the one or more emails is done repeatedly on a regular basis.

15. The system of claim 10, wherein the authenticity score is based on a domain age of each of the one or more potential phishing emails and a domain reputation of each of the one or more potential phishing emails.

16. The system of claim 15, wherein the domain reputation of the domain of the sender is determined through an email authentication technique such as Sender Policy Framework (SPF).

* * * * *